United States Patent [19]

Tse et al.

[11] Patent Number: 5,069,955

[45] Date of Patent: * Dec. 3, 1991

[54] FILM AND BLENDS OF POLYETHERAMIDE BLOCK COPOLYMER AND ETHYLENE VINYL ALCOHOL

[75] Inventors: Samuel W. Tse; George O. Schroeder, both of Appleton, Wis.; Teruo Iwanami, Ibaraki, Japan

[73] Assignee: American National Can Company, Chicago, Ill.

[*] Notice: The portion of the term of this patent subsequent to Jan. 5, 2005 has been disclaimed.

[21] Appl. No.: 471,009

[22] Filed: Jan. 25, 1990

Related U.S. Application Data

[63] Continuation of Ser. No. 747,385, Jun. 21, 1985, abandoned, which is a continuation of Ser. No. 670,302, Nov. 14, 1984, abandoned, which is a continuation-in-part of Ser. No. 588,820, Dec. 8, 1983, abandoned.

[51] Int. Cl.$^5$ .................. B32B 27/08; B32B 27/28
[52] U.S. Cl. ............................... 428/213; 428/333; 428/475.5; 428/475.8; 428/910; 264/171; 264/331.15; 264/176.1; 525/58; 525/92; 525/88; 525/926
[58] Field of Search .................... 525/88, 92, 58; 428/910, 475.5, 475.8, 333, 213; 264/171, 176 R, 331.15

[56] References Cited

U.S. PATENT DOCUMENTS

| | | | |
|---|---|---|---|
| 3,440,316 | 4/1969 | Miyake et al. | 264/288 |
| 4,082,854 | 4/1978 | Yamada et al. | 426/106 |
| 4,347,332 | 8/1982 | Odorzynski et al. | 524/169 |
| 4,365,041 | 12/1982 | Okamoto et al. | 525/58 |
| 4,427,825 | 1/1984 | Degrassi et al. | 525/58 X |
| 4,464,438 | 8/1984 | Lu | 525/58 X |
| 4,500,677 | 2/1985 | Maruhashi et al. | 525/57 |
| 4,562,118 | 12/1985 | Maruhashi et al. | 428/412 |
| 4,717,618 | 1/1988 | Tse et al. | 525/58 X |

OTHER PUBLICATIONS

Deleens, "A New Generation of Thermoplastic Elastomers the Polyether Block Amide (PEBA)", presented at 39th Ann. Tech. Conf. of SPE, Boston, Mass., May 4–7, 1981.

Technical Bulletin on Polyether Block Amides (PEBA) Ato Chimie, Paris, Fr. (1982).

*Primary Examiner*—Fred Teskin
*Attorney, Agent, or Firm*—Robert Stenzel

[57] ABSTRACT

Ethylene vinyl alcohol copolymer is blended with polyetheramide block copolymer to form a novel composition of matter. The blended composition can be extruded and/or coextruded to make packaging films. In the most preferred embodiments, the blend is contained as one layer in a film comprising a multiplicity of layers, and at least the blend layer is molecularly oriented. Methods of making the films are also disclosed.

74 Claims, 1 Drawing Sheet

FIG. 1

FILM AND BLENDS OF POLYETHERAMIDE BLOCK COPOLYMER AND ETHYLENE VINYL ALCOHOL

CROSS REFERENCE TO RELATED APPLICATIONS

This is a continuation of application Ser. No. 747,385, filed June 21, 1985, now abandoned, which is a continuation of Ser. No. 670,302, filed Nov. 14, 1984, now abandoned, which in turn is a continuation-in-part of Ser. No. 558,820, filed Dec. 8, 1983, now abandoned.

BACKGROUND OF THE INVENTION

Ethylene vinyl alcohol copolymer (EVOH) is known to provide an excellent oxygen barrier property when used in making packaging films. And while films containing EVOH have been developed and are being used, the physical properties inherent to EVOH lend certain difficulties to the fabrication and use of EVOH-containing films. EVOH is stiff and punctures easily. EVOH is not readily thermoformed. Orientation of EVOH is accomplished only with difficulty, and within a narrow range of process operating parameters.

These problems are recognized and addressed in U.S. Pat. No. 4,347,332 NYLON/EVOH BLENDS, issued Aug. 31, 1982; and U.S. patent application Ser. No. 290,172 entitled POLYMERIC BLENDS OF EVOH COPOLYMER AND FILMS MADE FROM THOSE BLENDS, filed on Sept. 20, 1982 now abandoned, in the name of David L. Newsome. Another related U.S. patent application is Ser. No. 464,730 entitled ORIENTED EVOH/NYLON BLEND FILM, which is a continuing U.S. patent application of Ser. No. 290,171, filed Aug. 5, 1981 now U.S. Pat. No. 4,911,112. The above documents teach improvements in technology relating to EVOH-containing films. And while the improvements do represent advances in technical knowledge, there remain certain problems associated with the use of EVOH polymers.

It is also known that EVOH is susceptible to degradation of its oxygen barrier property in the presence of high humidity, or moisture vapor content, at the EVOH layer. In order to ensure that the EVOH has a low humidity environment within which to operate, the EVOH is usually used in combination with other polymeric layers which are positioned so as to provide a moisture barrier between the EVOH layer and an environment potentially having an unacceptably high moisture content. Thus it is common to find EVOH used in multiple layer structures which include moisture barrier materials such as polyethylenes.

It is further known that EVOH loses some of its sensitivity to moisture, and thus has improved functionality as a barrier component of film, when it is molecularly oriented or otherwise formed without remelting after the making of a film containing EVOH. The process of orienting the EVOH, however, has proved to be difficult because of the physical properties of EVOH. In general, the EVOH, either alone, or in a multiple layer film, has a tendency to split or tear during the orientation process. Although the mechanism is not known for sure, this tendency might be explained in terms of the high degree of crystallinity of EVOH films. Whatever the mechanism, processing of EVOH subsequent to forming a film has proved to be extremely difficult. This difficulty has retarded large scale use of EVOH in the oriented form. While some oriented films may be made which are functionally acceptable, many of those films exhibit a high haze level, which is commercially unacceptable.

One method of improving the processability of EVOH film is taught by U.S. Pat. No. 4,451,599, issued May 29, 1984. In that patent, it is taught that certain plasticizers may be blended into the EVOH to improve its performance in the orientation process. While these plasticizers do fulfill the plasticizing role, in that the plasticized EVOH film can be subsequently oriented with ease and the expected reduced moisture sensitivity can be achieved, the plasticizers migrate toward the surface of the film and change the film surface properties over a period of time. While the surface properties may not be critical for some uses, in many cases the changes in surface properties caused by the migration are not acceptable, and another means of modifying the properties of the EVOH layer is desired.

Another method of improving properties of an EVOH film is set forth in U.S. Pat. No. 4,347,332. In that patent, it is proposed to blend nylon along with a plasticizer, with the EVOH in order to make a clear and desirable film. While a clear and desirable film may be made by this process, it has been found that, after a relatively short processing time in the extrusion of some of the polymer blends to form film, gels begin to appear in the film and get progressively worse until shut-down of the extrusion process is required.

The critical issue addressed herein by the inventor, then, is that of modifying the EVOH to avoid its undesirable physical characteristics; so that the EVOH layer is susceptible to commercial processes of extrusion and orientation, to produce a commercially acceptable clear barrier film. The perplexing problem is that of discovering a compound or family of compounds which can be blended with EVOH to form a compatible blend and which will also modify the undesirable properties; all this without suffering the problems of migration and surface property changes commonly associated with plasticizers.

It is an object of this invention to provide a novel composition of modified EVOH which can be extruded continuously for long periods of time to produce novel films tougher than similar films having unmodified EVOH.

It is another object of the invention that the novel films be easily susceptible to orientation in the machine direction—uniaxially—and in both the machine direction and cross-machine direction—biaxially.

It is further object that the resulting oriented film be clear, that is, exhibit a low level of haze. The low haze in the oriented form, then, confirms the functional compatibility of the materials, and, in turn, good layer integrity, while satisfying the appearance requirements essential to its commercial acceptance. The films should exhibit good oxygen barrier properties as exemplary of EVOH, and improved oxygen barrier properties at high humidity, as compared to those in the unoriented form, as exemplary of oriented EVOH.

It is yet another object that the physical properties of the film surface, and particularly surface friction, be more or less constant with time.

SUMMARY OF THE INVENTION

In its most general form, the invention is embodied in a composition of matter which is a compatible blend of about 1 percent to about 40 percent by weight of a polyetheramide block copolymer (PEBA), and about 60 percent to about 99 percent by weight ethylene vinyl alcohol copolymer.

In another form, the invention is a polymeric film which has been made from the compatible blend of the polyetheramide block copolymer and the ethylene vinyl alcohol copolymer. In some preferred embodiments of the film, the film includes, on each surface thereof, a layer of nylon polymer, the result being a film having at least three layers with two layers of nylon and a layer of the blend material therebetween. There may be additional layers juxtaposed on either or both of the nylon layers, as discussed hereinafter. The multiple layer embodiments may provide ease of processing, economy, and abuse resistance.

In the most preferred form of the article of the invention, the film is molecularly oriented in a multiple layer structure. Orientation ratios are up to about 5/1 for uniaxial orientation and up to about 4×4 for biaxial orientation. In such a preferred article, the overall oriented film thickness is about 1.0 mil, more or less, and the thickness of the blend layer of ethylene vinyl alcohol and polyetheramide block copolymer is about 20% to 50% of the overall thickness of the film.

The invention is further exemplified in a method of making a film. The method comprises forming a mixture of about 1 weight percent to about 40 weight percent of a polyetheramide block copolymer and about 60 percent to about 99 percent ethylene vinyl alcohol copolymer, extruding the mixture through an extruder and die apparatus to form a film, in which the mixture is present as a layer of blended materials of the mixture, and cooling the film. To make the most preferred form of the article of the invention, the method comprises coextruding the film with a layer of nylon on each surface of the blend to form a three layer film comprising nylon on each surface thereof and a core layer of the blend. The film is finally completed in its most preferred form by reheating it and molecularly orienting it.

The thus produced film may be used directly, or may be combined with other layers in forming a more complex film. It is contemplated that the above-described blend layer may be incorporated into any one member of a large family of films. These films may be constructed by sequential forming and laminating of the various layers. They may preferrably be made by coextrusion of all the polymer layers together, optionally followed by simultaneous orientation of all the layers. Variations on these and other means of forming the films will be obvious to those skilled in the art.

DETAILED DESCRIPTION OF THE INVENTION

EVOH copolymers useful in this invention generally contain at least about 55, up to about 80, weight percent vinyl alcohol. Preferred EVOH copolymers generally contain about 60 to 75 weight percent of the vinyl alcohol moiety. The remainder of the molecule consists primarily of ethylene. There is usually present in the EVOH molecule a residual amount of vinyl acetate, since the EVOH is made by an hydrolysis reaction of the ethylene vinyl acetate molecule. Commercially available EVOH is highly hydrolyzed, usually to greater than 99 percent by weight. Especially desirable EVOH copolymers are Soarnol ET and Soarnol D sold by Nippon Gohsei, Japan, and EVAL EP-E and EP-F, sold by Kuraray, Japan.

The PEBA copolymers useful in this invention contain blocks of polyamide and polyether moieties in the polymer chain. A general formula for these polymers is:

PA = polyamide
PE = polyether

Figure 1:
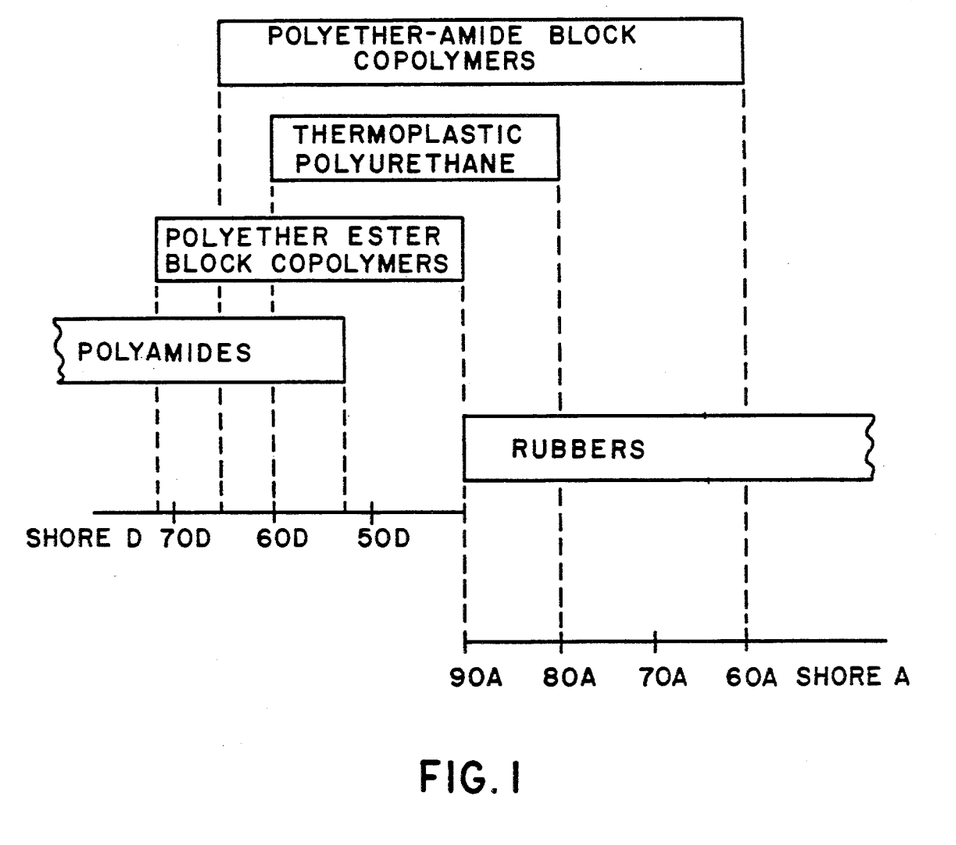
FIG. 1 is a chart representation showing the Shore Hardness of PEBA polymers in relation to other polymers and rubbers.

The composition ratio PE/PA in the copolymer may vary from 20/80 to 80/20. The polyamide component may be any of the conventional polyamides, such as nylon 6, nylon 66, nylon 6/66, nylon 11 and nylon 12. The polyether component is usually, but not necessarily, selected from polyoxyethylene, polyoxypropylene and polyoxytetramethylene. The melting point of known PEBA's is about 120° to 205° C., and the Shore Hardness is about 65D to 60A as shown on the chart of FIG. 1. Preferred PEBA's are sold by Ato Chemie under the tradename PEBAX. Typical of their polymer resins is PEBAX 5512, which has a melting point of 195° C. and Shore Hardness of 55D. This PEBA is generally desirable because its generally soft "hardness" is conducive to a softening modification of the hard and brittle EVOH when blended with the EVOH. Other successfully tested PEBA's are PEBAX 3533 and PEBAX 4033, also sold by Ato Chemie. PEBAX 3533 has a melting point of 152° C. and Shore Hardness of 80A. PEBAX 4033 has a melting point of 168° C. and a Shore Hardness of 40D.

The invention in its broadest sense is represented by a blend composition of EVOH and PEBA. The blend contains, by weight, about 60 percent to about 99 percent EVOH and conversely about 1 percent to about 40 percent PEBA, wherein the PEBA functions in the role of a plasticizing modifier for the EVOH-PEBA blend. The preferred range for the common applications is 1 to 20 percent PEBA and 80 to 99 percent EVOH. That preference does vary depending on, for example, the specific EVOH and PEBA polymers used, the fabrication processes, the overall final structure, and the contemplated environments encountered by the finished package. The lower end of the range of blends, of about 1% PEBA, represents an area where the PEBA's have diminishing efficacy in the desired affect of the plasticizing function. The plasticizing function and its affect on the material of the composition is detectable by determining changes in the properties of film as regards deformation of the film without rupture. In one type of deformation measurement, a strip of film is elongated as in an Instron Tensile Tester until the film breaks. Results are reported in terms of percent elongation up to the breaking point of the film and maximum tensile strength over the elongation test. In another measurement, an essentially continuous sheet of the film is molecularly stretch oriented in apparatus and process such as are taught, particularly in FIG. 3, of U.S. patent application Ser. No. 446,009, dated Dec. 1, 1982, incorporated herein by reference.

Elongation tests are particularly useful as means for detecting differences in plastic films because they can be run at a variety of controlled environmental conditions, and particularly temperatures. As is seen hereinafter, films having different compositions may appear to have essentially identical properties at one set of conditions while having differing properties at another set of conditions. For example, polymeric blends of the invention having low levels of PEBA may not exhibit elongation properties different from those of unplasticized EVOH at room temperature. One might surmise, then, that the PEBA is not functioning as a plasticizer. However, significant plastic deformation differences may be seen when the test is conducted at elevated temperatures on the order of 80° C. to 100° C. Increase in the percent elongation before break, as compared to the unplasticized EVOH, is seen as evidence of increased plastic deformation resulting from the plasticizing affect of the PEBA. Thus, carefully chosen and controlled conditions are sometimes necessary for gathering evidence of functional differences between novel films of this invention and prior art films using EVOH without the PEBA being incorporated therein.

Stretch orientation test are conducted at carefully selected and controlled operating conditions as described in the referenced application serial number 446,009. By definition, the greater the amount of possible stretch/orientation for a given film, the greater the plastic deformation taking place. Increases in the stretch ratio for films having plasticized compositions are evidence of the plasticizing affect being exerted by the plasticizer.

Depending on the specific PEBA, and the specific EVOH, being used, compositions of up to 40 percent PEBA are contemplated. At the higher concentrations of PEBA, the oxygen barrier properties normally attributed to EVOH may be partially compromised, which is probably attributable to the dilution of the EVOH concentration. Above the upper limit of the range, of 40% PEBA, the beneficial plasticizing effect is being traded for an unacceptable amount of reduction in the oxygen barrier.

Another aspect of the invention is represented by films made from the EVOH-PEBA blends. While single layer unsupported film may be made by conventional extrusion techniques, the film is preferrably formed as part of a coextrusion. A typical coextrusion is /nylon/-blend/, 0.4 to 2.0 mils thick, with the blend layer being about 20% to 50% of the thickness of the two-layer composite. Another typical coextrusion is /nylon/blend/nylon/, 0.4 to 2.0 mils thick, with the blend layer being about 20% to 50% of the thickness of the three layer composite. Constructive to the illustration of the above two and three layer coextrusions, the leading and trailing slashes represent contemplated additional layers which may be positioned on either side, or on both sides, of the coextrusion to provide additional desired functional properties. Structures having exemplary ones of such additional layers are shown hereinafter.

A particularly advantageous property of the EVOH-PEBA blends of this invention, as compared to the previously mentioned EVOH-nylon blends, is that they may be processed continuously through the extruder-die apparatus for extended periods of time without gel formation or other polymer degradation. As a secondary testing technique, to compare processability of EVOH-PEBA blends against conventional EVOH-nylon blends, two blends were processed separately in a Barbender mixer. Each combination of blend materials was heated to melting and was mixed continuously for one hour while the torque required for mixing was continuously recorded. In both cases, the mixing torque was initially less than 1 ft. 1b. The torque increased steadily with the EVOH-nylon blend; while the torque of the EVOH-PEBA blend remained relatively constant. The blend compositions and the final torques after the one hour mixing were:

| Blend | Final Torque |
| --- | --- |
| 80% EVOH - 20% PEBA | 0.62 ft. lbs. |
| 80% EVOH - 20% Nylon 6/66 | 9.79 ft. lbs. |

The above test data confirm that material in an extruder and die apparatus processing a conventional EVOH-nylon blend may have process-time limitations; but make no such suggestion for processing blends of EVOH-PEBA. As a primary testing technique, the inventor has subjected the EVOH-PEBA blend to extended conventional extrusion processing and has found no time limitations on extrusion processing of the blend compositions of the invention. Because the PEBA contains a significant proportion of polyamide building blocks, as do all nylons, it would be expected that PEBA's would have extrusion properties similar to those of nylon. As seen in the above test, the PEBA in the blend provides a critical functional capability not necessarily available when nylon alone is blended with EVOH.

As stated earlier, the most efficient use of EVOH as an oxygen barrier, and particularly as regards use in a moist environment, is in the oriented form, either uniaxially oriented or biaxially oriented. The invention is best represented by this most efficient form of the use of EVOH. Recalling first that the normal orientation problems with EVOH are related to its stiffness and rigidity, and that these are commonly attributed to its crystallinity, in those cases where orientation is contemplated, the processing operations should provide minimal opportunity for crystal formation in the extrusion process. Thus, when the film is to be oriented, the film should be cooled quickly upon exiting the extruder die. Exemplary of acceptable processes to accomplish this are those where the film is cast against a chill roll as in cast extrusion or where the film is passed through a quenching liquid medium as in tubular water quenched extrusion.

Once the film is formed, it may then be reheated and oriented either uniaxially or biaxially. This can be done in an in-line operation or an out-of-line operation. In the orientation process, it appears that the PEBA functions as a plasticizing agent for the EVOH. It apparently accomplishes this, however, without the attendant migration of the PEBA to the surface of the layer, as is common with conventional plasticizers: as no change in surface friction, with time, has been detected.

Acceptable uniaxial orientation ratios are up to about 5/1. For biaxial orientation, acceptable ratios are up to about 4×4. In general, the higher the orientation ratio, either uniaxial or biaxial, the better are the barrier properties exhibited by the EVOH. The preferred ratio, then, is the highest ratio which can be achieved efficiently on available hardware for the given EVOH blend composition and film; and that ratio will vary according to the hardware being used. While biaxial orientation has been represented as being the same amount, or uniform, in both axes of orientation, there may be substantial deviation from that sameness, with the only requirement being that the amount of stretch on each axis is up to about 4 times the original unstretched dimension. Thus 2×4 orientation is acceptable, for example, as is a 4×2 a 4×3 or a 3×4. Thus any recitation of a range of uniform biaxial stretching ratios is meant to include all non-uniform ratios possible within the range. The resulting film in any of these cases is uniform and clear.

In retrospect, it is seen that the results obtained from making a film from a blend of EVOH and PEBA yield a basic understanding of the operation of the blend material as a polymer. The basic concept derived is that the PEBA functions to lend its softness, flexibility, and toughness to the otherwise relatively brittle and fragile EVOH, thereby modifying its properties to yield a film having improved extensibility and toughness. This concept holds true for all PEBA polymers. Some films which cannot otherwise be successfully oriented become orientable with the inclusion of PEBA. Also, some films which can be oriented without the inclusion of PEBA are easier to orient, and are tougher films, with the inclusion of PEBA. Thus, in some cases the inclusion of the PEBA makes orientation possible, and in other cases it makes orientation easier.

Regarding the selection of the specific PEBA to be used, the softer PEBA's can provide the necessary extensibility for moderate orientation ratios with the minimum use of PEBA. For the greater toughness required of films which are subjected to higher levels of orientation, and primarily as regards biaxial orientation, the harder PEBA's lend substantially more toughness than the softer PEBA's and are generally preferred. Where toughness is a significant requirement as far as the package protecting the product, the primary purpose of the PEBA may be to impart toughness, and a PEBA having more toughness, as represented by a harder Shore Hardness, will be selected. Thus the selection of the specific PEBA to be used is more or less governed by the amount of orientation and the process and use environments contemplated; although it is seen following, that the selection of the specific PEBA may also be interdependent on other factors.

The primary factors governing the EVOH/PEBA ratio in the blend have to do with the specific EVOH selected and the contemplated end use. Since the functionality of the EVOH as an oxygen barrier is usually the primary purpose of the layer, the selection of the specific EVOH polymer is usually the first step in designing the EVOH-PEBA blends. Given the selection of the specific EVOH, then for any PEBA selected, there is a range of properties available within the range of EVOH/PEBA ratios defined as acceptable. Should that range of properties not satisfy the required parameters, then the selection of at least one of the specific polymers is changed. Since the EVOH is the primary operative polymer; and since the PEBA is primarily used for the purpose of modifying the EVOH to facilitate its processing; then, in most cases, where a specific polymer combination does not provide the required parameters within the range of those available, then the preferred polymer for change, substitution, or modification, is the PEBA. However, if selecting an alternate PEBA, or modifying the PEBA, cannot be made to yield the required parameters, then an alternate EVOH is selected. For example, for use in moist environments, such as for packaging meat or cheese, preferred EVOH has a relatively high ethylene content, such as 38% to 48%. Within the context of all EVOH polymers, those polymers having the higher ethylene content tend to be relatively softer and more extensible; and so typically they will have lower requirements so far as the amount of improvement in softness and extensibility is concerned. The blends designed for these uses generally will fall toward the higher end of the EVOH/PEBA ratios given, as the required amount of modification, to the EVOH, is somewhat less. The specific PEBA selected will, of course, have an affect, too.

For use in dry environments, such as packaging dry snacks like potato chips, the preferred EVOH has a relatively low ethylene content, such as 29% to 35%. Within the context of all EVOH polymers, the polymers having the lower ethylene content tend to be relatively harder and more brittle, and so, typically, will have higher requirements as far as the amount of improvement required in softness and extensibility. The blends designed for these uses generally will fall toward the lower end of the EVOH/PEBA ratios given, as the required amount of modification, to the EVOH, is somewhat greater. A larger EVOH/PEBA ratio may, of course, be used where a softer PEBA may be selected while still providing both the required softness and the required toughness.

Regarding specific multiple layer film structures, the EVOH/PEBA mixture is most conveniently fabricated into a film containing the blend by means of a coextrusion process. In most cases the blend layer is an interior layer in the structure, as compared to the exterior layers, when coextruded. A typical multiple layer structure includes nylon/blend/nylon, which may be a subassembly or a component of the completed film structure. As typical of completed film assemblies, there may be mentioned:

Typical Structures of Complete Films nylon/blend/nylon/sealant
nylon/blend/nylon/EVA/sealant
nylon/blend/nylon/tie/EVA/sealant
nylon/blend/nylon/tie/EVA/tie/sealant
OPP/adh/nylon/blend/nylon/tie/EVA/tie/sealant
   adh = adhesive
   EVA = ethylene vinyl acetate
   OPP = oriented polypropylene
   sealant = heat sealable polymer
   tie = adhesive polymers Typical materials used in the tie layers of the foregoing structures are the carboxy modified polymers sold by Chemplex as Plexar 1 and DuPont as CXA 3101. Typical materials used in the sealant layer are ionomer, EVA, and low density polyethylene (LDPE); and indeed blends of some of these materials are typically used. There are only two functional requirements of the sealant layer. First, it must have acceptable adhesion to the adjacent layer. Second, it must have heat sealing properties compatible with heat sealing, preferrably by driving heat from a heat seal bar through all the layers between the sealant layer and the opposite surface of the film.

It is, of course, possible to make certain conventional modifications to the films, or to the processes of making them, without affecting the capabilities of the films to perform their intended functions.

The exemplary film assemblies as shown above may be desirably uniaxially oriented, such as by stretch orienting in the machine direction to make oriented films which are highly desirable for use in packaging dry snack foods. Similarly they may be biaxially oriented for other packaging uses. It is, of course, highly conventional to add layers to the film after the orientation operation. These additional layers, such as OPP, provide additional functional properties.

In the design of some films, it will be found desirable to improve the interlayer adhesion at certain of the layer interfaces. Where additional adhesion is desired within a coextruded film, a tie, or adhesive, polymer may be used as a thin layer for enhancing adhesion between the two layers it contacts, as shown in the above listing of typical structures of complete films. As taught in U.S. Pat. Nos. 4,233,367 to Ticknor and Rein, 4,239,826 to Knott and Wang, and 4,254,169 to Schroeder, a number of extrudable adhesives suitable for use are available. Typical adhesives for use in films of this invention are the products sold by Chemplex Company under the Plexar designation, the resins sold by Mitsubishi Chemical under Novatec AP designation and the resins sold by DuPont Company under the CXA designation.

These adhesives are usually olefinic polymers or copolymers which employ carboxy modifications of the general nature which provide the desired bonding capabilities. These adhesive resins are commercially available, and their uses will be obvious to those skilled in the art.

EXAMPLE 1

Pellets of Soarnol ET ethylene vinyl alcohol copolymer were mixed with pellets of PEBAX 5512 copolymer in a weight ratio of 80% EVOH to 20% PEBA. The solid pellets were dry blended at room temperature to achieve a uniform mixture. The thus mixed pellets were extruded in a cast coextrusion process with nylon 6 on each side of the blend layer to form a three layer film of nylon/blend/nylon. The thus produced film was 2.85 mils thick. The film was uniaxially oriented at a stretch ratio of 3.5 to 1. The resulting stretched film was about 1 mil thick overall. The blend layer was about 0.4 mil thick. The oriented film was clear, indicating good compatibility. Haze was about 1%, according to ASTM D1003. Samples of the oriented film were tested for oxygen permeability and haze. The reported oxygen permeability was 49 cc/m$^2$/24 hr. day at 73° F., 100% R.H. Haze was 1.0%. The oxygen permeability of the corresponding unoriented film of the same thickness and thickness ratios was greater than 200 cc/m$^2$/day under the same test conditions. At 0% R.H. and 73° F., the oxygen permeability of the test film was only 2.5 cc/m$^2$/day.

EXAMPLE 2

A film was coextruded and oriented as in EXAMPLE 1 except that the blend ratio was 90% by weight EVOH and 10% PEBA. The oxygen permeability at 73° F., 100% R.H. was 32 cc/m$^2$/24 hrs. day, the haze was 1.0%. The oxygen permeability was less than 1 cc/m$^2$/day at 0% R.H. and 73° F.

COMPARATIVE EXAMPLE 1

A control film was made and oriented as in EXAMPLES 1 and 2 except that no PEBA was used. The core layer of the 3-layer film was 100% EVOH. The oxygen permeability was 24cc/m$^2$/day at 73° F., 100% R.H., but the haze measurement was 3.9%. The film was a milky white on the roll. While the film may be functional as a barrier film, its appearance as characterized by the higher haze makes it unacceptable for commercial application, and thus unsaleable.

EXAMPLE 3

Pellets of Soarnol ET were dry blended with pellets of PEBAX 5512 in a weight ratio of 80% Soarnol ET to 20% PEBAX, as in EXAMPLE 1. A 4.25 mil film was coextruded. The resulting film was biaxially oriented at a 2.5×2.5 stretch ratio. The resulting film had good clarity and tested oxygen permeability of 30 cc/m$^2$/24 hr. day at 73° F., 100% R.H.

EXAMPLE 4

A 4.25 mil film was made as in EXAMPLE 3 except that the blend ratio was 90% Soarnol ET and 10% PEBAX 5512. The film was biaxially oriented at a 2.5×2.5 stretch ratio. The resulting film had good clarity and tested oxygen permeability of 27 cc/m$^2$/24 hr. day at 73° F., 100% R.H.

Additional experiments were conducted to determine the affects of low levels of PEBA addition to EVOH, and particularly concentrating on blends having 1% to 5% PEBA and correspondingly 95% to 99% EVOH. These are compared to prior art films without PEBA and to films of the invention comprising 10% PEBA and 90% EVOH.

EXAMPLES 5-10

Cast coextrusion equipment was utilized to produce three-layer base films having a total thickness of 3.5 mils. The two outer layers were nylon 6. The inner, or core, layer in each film was a blend of Soarnol DE EVOH and PEBAX 4033 polyetheramide block copolymer. The overall structure of the films was NYLON/BLEND/NYLON with corresponding weight percentages of 30/40/30. All film samples were produced with the same processing conditions. Samples of the three-layer base films were uniaxially stretch oriented to evaluate stretchability. All the stretched samples were stretch oriented at the same conditions. Surface temperatures of the contacting rolls during stretching were approximately 110° C. Annealing temperature was 154° C. All the films ran well at 3.5/1 stretch ratio. The stretch ratio was then gradually increased for each sample until the film broke. The stretch ratio at break was recorded, and is submitted herein in Table 2 as an indication of plasticity imparted by the PEBA where the blend structure had increased stretch ratio as compared to a similar prior art 3-layer film using 100% EVOH as the core layer. The prior art 3-layer film was extruded and samples were oriented in the same manner as EXAMPLES 5-10 and is designated COMPARATIVE EXAMPLE 2.

TABLE 2

| Example No. | Blend Composition | Maximum Stretch Ratio | Percent Increase over Control |
| --- | --- | --- | --- |
| Comparative No. 2 | 100% Soarnol DE | 4.10 | — |
| 5 | 1% PEBA - 99% DE | 4.56 | 11% |
| 6 | 2% PEBA - 98% DE | 4.51 | 10% |
| 7 | 3% PEBA - 97% DE | 4.48 | 9% |
| 8 | 4% PEBA - 96% DE | 4.52 | 10% |
| 9 | 5% PEBA - 95% DE | 4.93 | 20% |

TABLE 2-continued

| Example No. | Blend Composition | Maximum Stretch Ratio | Percent Increase over Control |
|---|---|---|---|
| 10 | 10% PEBA - 90% DE | 4.91 | 20% |

It is seen from Table 2 that as little as 1% PEBA in the blend consistently provides for an increase of about 10% to 20% in the maximum stretch ratio of the 3-layer film. Optical properties of all the films of EXAMPLES 5-10 were excellent up to the breaking point of the film.

The base films from which EXAMPLES 5-10 were taken, were further used for testing film clarity and oxygen barrier properties. Samples of each of the base films were stretch oriented at an orientation ratio of 3.5/1. The stretched samples are designated EXAMPLES 11-16; and their clarity and oxygen barrier properties are reported in Table 3. Comparative Example 3 is used as a control at 100% EVOH, 0% PEBA.

TABLE 3

| Example No. | Blend Composition | Oxygen Transmission* 100% R.H. 73° F. | Oxygen Transmission* 0% R.H. 73° F. | Percent Haze |
|---|---|---|---|---|
| Comparative Ex. 3 | 100% Soarnol DE | 1.9 | <1 | 5.6 |
| 11 | 1% PEBA-99% DE | 2.3 | <1 | 1.0 |
| 12 | 2% PEBA-98% DE | NM | NM | 1.0 |
| 13 | 3% PEBA-97% DE | 2.1 | <1 | 1.1 |
| 14 | 4% PEBA-96% DE | NM | NM | 1.4 |
| 15 | 5% PEBA-95% DE | 1.85 | <1 | 1.9 |
| 16 | 10% PEBA-90% DE | 2.0 | <1 | 3.3 |

*cm³/m² - 24 hr. - mil thickness
NM = not measured
< = less than

It is seen from Table 3 that the clarity of the oriented film is improved even with low levels of addition of PEBA such as 1% to 5%. The oxygen transmission results confirm that the oxygen barrier property of EVOH is effective for blends of PEBA and EVOH at these ratios as well as at the levels illustrated in the earlier EXAMPLES.

EXAMPLES 17-22

Single layer films of the invention were tested for maximum elongation. The films were produced by extrusion forming of single layer films of the compositions of the individual examples and of Comparative Example 4. For the elongation test, a one inch wide strip of the film was clamped in the 2 opposing jaws of an Instrom Tensile Tester with the jaws 2 inches apart. The jaws and sample were inside an enclosure so that the elongation test could be performed at selected and controlled temperatures.

When the desired temperature was reached inside the enclosure, the jaws were slowly moved apart, effecting elongation of the test film strip. The test was stopped when the film broke, and the elongation was reported in percent as $$\frac{\text{Length at break}}{\text{2 inches initial length}} \times 100.$$

The results of the tests are shown in Table 4, as the average of five test samples.

TABLE 4

| | | 80° C. | | 90° C. | | 100° C. | |
|---|---|---|---|---|---|---|---|
| Example No. | Blend Composition | Percent Elongation | Change from Comparative Example | Percent Elongation | Change from Comparative Example | Percent Elongation | Change from Comparative Example |
| Comparative No. 4 | 100% EVOH | 577% | | 621 | | 654* | |
| 17 | 1% PEBA—99% EVOH | 494% | −14% | 565 | −10% | 680* | +4% |
| 18 | 2% PEBA—98% EVOH | 522% | −10% | 585 | −6% | 700* | +7% |
| 19 | 3% PEBA—97% EVOH | 530% | −8% | 588 | −5% | 695* | +6% |
| 20 | 4% PEBA—96% EVOH | 591% | +2% | 660 | +6% | 638* | −2% |
| 21 | 5% PEBA—95% EVOH | 605% | +5% | 672 | +8% | 679* | +4% |
| 22 | 10% PEBA—90% EVOH | 635% | +10% | 646* | +4% | 658* | +1% |

*Film in at least one sample did not break at maximum jaw separation of 14 inches.
Recorded and calculated as $\frac{14}{2} \times 100 = 700\%$ elongation for the specific sample.
Used 700% for computing average.

It is seen from Table 4 that as little as 1% PEBA is effective to increase elongation at 100° C. About 4% PEBA is effective to increase elongation at 80° C. to 90° C..

Optical properties of all of EXAMPLES 17-20 were excellent.

Those skilled in the art will now recognize that minor amounts of nylon may be blended into the EVOH/PEBA blend, and same is contemplated wherever the blend is recited herein.

In testing the films of the invention, including single layer films, no evidence was found of any film surface properties changing with time. Thus it is concluded that the PEBA does not lend variable surface properties to the EVOH-PEBA blend layer; and that the PEBA does not interfere with the functionality of the EVOH.

Having thus described the invention, what is claimed is:

1. As a composition of matter, a polymeric blend, comprising:
   (a) about 1 percent to less than 5 percent by weight polyetheramide block copolymer; and
   (b) about 99 percent to more than 95 percent by weight ethylene vinyl alcohol copolymer,
the polyetheramide block copolymer having the formula:

wherein PA is a polyamide and PE is a polyether, n being an integer indicative to the degree of polymerication of the block copolymer, the degree of polymerication being such that its Shore Hardness is about 65D to 60A.

2. A blend as in claim 1 wherein said polyetheramide block copolymer has a Shore Hardness of 55D to 80A.

3. A polymeric film made from a compatible polymeric blend, said blend comprising:
   (a) about 1 percent to less than 5 percent by weight polyetheramide block copolymer; and
   (b) about 99 percent more than to 95 percent by weight ethylene vinyl alcohol copolymer, the polyetheramide block copolymer having the formula:

wherein PA is a polyamide and PE is a polyether, n being an integer indicative of the degree of the polymerization of the block copolymer, the degree of polymerization being such that its Shore Hardness is about 65D to 60A.

4. A film as in claim 3 wherein said polyetheramide block copolymer has a Shore Hardness of 55D to 80A.

5. A polymeric film as in claim 3 including, on at least one surface thereof, a layer of nylon polymer.

6. A molecularly oriented polymeric film made from a compatible polymeric blend, said blend comprising:
   (a) about 1 percent by weight to less than 5 percent polyetheramide block copolymer; and
   (b) about 99 percent to more than 95 percent by weight ethylene vinyl alcohol copolymer,
the polyetheramide block copolymer having the formula:

wherein PA is a polyamide and PE is a polyether, n being an integer indicative of the degree of polymerication of the block copolymer, the degree of polymerication being such that its Shore Hardness is about 65D to 60A.

7. An oriented film as in claim 6 including, on at least one surface thereof, a layer of nylon polymer.

8. An oriented film as in claim 7 wherein said film is uniaxially oriented at a ratio of up to about 5/1.

9. An oriented film as in claim 7 wherein said film is biaxially oriented at a ratio of up to about 4×4.

10. An oriented film as in claim 6 wherein said polyetheramide block copolymer has a Shore Hardness of 55D to 80A.

11. An oriented film as in claim 7 wherein said polyetherzmide block copolymer has a Shore Hardness of 55D to 80A.

12. An oriented film as in claim 8 wherein said polyetheramide block copolymer has a Shore Hardness of 55D to 80A.

13. An oriented film as in claim 9 wherein said polyetheramide block copolymer has a Shore Hardness of 55D to 80A.

14. An oriented film as in claim 6 wherein said polyether amide block copolymer has a Shore Hardness of about 55D.

15. An oriented film as in claim 7 wherein said polyetheramide block copolymer has a Shore Hardness of about 55D.

16. An oriented film as in claim 8 wherein said polyetheramide block copolymer has a Shore Hardness of about 55D.

17. An oriented film as in claim 9 wherein said polyetheramide block copolymer has a Shore Hardness of about 55D.

18. An oriented film as in claim 7 wherein the overall film thickness is about 0.4 to 2.0 mils and the thickness of said blend layer of ethylene vinyl alcohol and polyetheramide block copolymer is about 20% to 50% of the overall thickness of said film.

19. An oriented film as in claim 8 wherein the overall thickness is about 0.4 to 2.0 mils, and the thickness of said blend layer of ethylene vinyl alcohol and polyetheramide block copolymer is about 20% to 50% of the overall thickness of said film.

20. An oriented film as in claim 9 wherein the overall film thickness is about 0.4 to 2.0 mils, and the thickness of said blend layer of ethylene vinyl alcohol and polyetheramide block copolymer is about 20% to 50% of the overall thickness of said film.

21. A molecularly oriented polymeric film, comprising:
   (a) a first layer of blend material comprising: (i) about 1 percent to less than 5 percent by weight polyetheramide block copolymer and (ii) about 99 percent to more than 95 percent by weight ethylene vinyl alcohol copolymer, said first layer having two surfaces;
   (b) second and third layers comprising nylon on the opposing surfaces of said first layer; and
   (c) a fourth layer on the surface of said third layer and comprising a heat sealable polymer or copolymer, having heat sealing properties compatible with heat sealing,
the polyetheramide block copolymer having the formula:

wherein PA is polyamide and PE is polyether, n being an integer indicative of the degree of polymerication of the block copolymer, the degree of the polymerization being such that its Shore Hardness is about 65D to 60A.

22. A molecularly oriented polymeric film as in claim 21 and including a fifth layer of ethylene vinyl acetate between said fourth sealant layer and said third layer.

23. A molecularly oriented polymeric film as in claim 21 and including fifth and sixth layers between said fourth sealant layer and said third layer, said fifth layer being ethylene vinyl acetate, said sixth layer an adhesive polymer comprising a carboxy modified olefin polymer or copolymer; said fifth layer being adjacent said fourth layer; and sixth layer being adjacent said third layer, said fifth layer and sixth layers having a common interface.

24. A molecularly oriented film as in claim 21 wherein said film is uniaxially oriented at an orientation ratio of up to about 5/1.

25. A molecularly oriented film as in claim 22 wherein said film is uniaxially oriented at an orientation ratio of up to about 5/1.

26. A molecularly oriented film as in claim 23 wherein said film is uniaxially oriented at an orientation ratio of up to about 5/1.

27. A molecularly oriented film as in claim 21 wherein said film is biaxially oriented at a ratio of up to about 4×4.

28. A molecularly oriented film as in claim 22 wherein said film is biaxially oriented at a ratio of up to about 4×4.

29. A molecularly oriented film as in claim 23 wherein said film is biaxially oriented at a ratio of up to about 4×4.

30. A molecularly oriented film as in claim 21 wherein the composition of said fourth sealant layer is chosen from the group consisting of low density polyethylene, ethylene vinyl acetate, ionomer, and blends of the members of said group.

31. A molecularly oriented film as in claim 22 wherein the composition of said fourth sealant layer is chosen from the group consisting of low density polyethylene, ethylene vinyl acetate, ionomer, and blends of the members of said group.

32. A molecularly oriented film as in claim 23 wherein the composition of said fourth sealant layer is chosen from the group consisting of low density polyethylene, ethylene vinyl acetate, ionomer, and blends of the members of said group.

33. A method of making a film, comprising:
(a) forming a mixture of about 1 weight percent to less than 5 percent of a polyetheramide block copolymer and about 99 percent to more than 95 percent by weight ethylene vinyl alcohol copolymer;
(b) extruding said mixture through an extruder and die apparatus to form a film in which said mixture is present as a layer of blended materials of said mixture and;
(c) cooling said film,
the polyetheramide block copolymer having the formula:

wherein PA is a polyamide and PE is a polyether, n being an integer indicative of the degree of polymerization of the block copolymer, the degree of polymerization being such that its Shore Hardness is 65D to 60A.

34. A method as in claim 33 including the subsequent steps of reheating the film and molecularly orienting it.

35. A method as in claim 33 and including coextruding, on one surface of said film, a layer of nylon to form a multiple layer film.

36. A method as in claim 35 and including the subsequent steps of reheating said multiple layer film and molecularly orienting it.

37. A method as in claim 33 and including coextruding, on both surfaces of said film, layers of nylon to form a multiple layer film.

38. A method as in claim 37 and including the subsequent steps of reheating the multiple layer film and molecularly orienting it.

39. A method as in claim 36 wherein said film is uniaxially oriented at a ratio of up to about 5/1.

40. A method as in claim 36 wherein said film is biaxially oriented at a ratio of up to about 4×4.

41. A method as in claim 38 wherein said film is uniaxially oriented at a ratio of up to about 5/1.

42. A method as in claim 38 wherein said film is biaxially oriented at a ratio of up to about 4×4.

43. As a composition of matter, a polymeric blend, comprising
(a) about 1 percent to less than 5 percent by weight polyetheramide block copolymer; and
(b) about 99 percent to more than 95 percent by weight ethylene vinyl alcohol copolymer,
the polyetheramide block copolymer having the formula:

wherein PA is a polyamide and PE is a polyether, n being an integer indicative of the degree of polymerication of the block copolymer, the degree of polymerication being such that the melting point is from about 120° C. to 205° C.

44. A polymeric film made from a compatible polymeric blend, said blend comprising:
(a) about 1 percent to less than 5 percent by weight polyetheramide block copolymer; and
(b) about 99 percent to about more than 95 percent by weight ethylene vinyl alcohol copolymer,
the polyetheramide block copolymer having the formula:

wherein PA is a polyamide and PE is a polyether, n being an integer indicative of the degree of polymerication of the block copolymer, the degree of polymerization being such that its melting point is from about 120° C. to 205° C.

45. A polymeric film as in claim 44 further including, on at least one surface thereof, a layer of nylon polymer.

46. A molecularly oriented film made from a compatible polymeric blend; said blending comprising:
(a) about 1 percent by weight to less than 5 percent polyetheramide block copolymer, and
(b) about 99 percent to more than 95 percent by weight ethylene vinyl alcohol copolymer,
the polyetheramide block copolymer having the formula:

wherein PA is a polyamide and PE is a polyether, n being an integer indicative of the degree of polymerication of the block copolymer, the degree of polymerization being such that its melting point is from about 120° C. to 205° C.

47. An oriented film as in claim 46 further including on at least one surface thereof, a layer of nylon polymer.

48. An oriented film as in claim 47 wherein said film is uniaxially oriented at a ratio of about 3/1 to 4/1.

49. An oriented film as in claim 47 wherein said film is biaxially oriented at a ratio of about 2×2 to 4×4.

50. An oriented film as in claim 47 wherein the overall film thickness is about 0.4 to 2.0 mils and the thickness of said blend layer of ethylene vinyl alcohol and polyetheramide block copolymers is about 20% to 50% of the overall thickness of said film.

51. An oriented film as in claim 48 wherein the overall film thickness is about 0.4 to 2.0 mils, and the thickness of said blend layer of ethylene vinyl alcohol and polyetheramide block copolymers is about 20% to 50% of the overall thickness of said film.

52. An oriented film as in claim 49 wherein the overall film thickness is about 0.4 to 2.0 mils, and the thickness of said blend layer of ethylene vinyl alcohol and polyetheramide block copolymers is about 20% to 50% of the overall thickness of said film.

53. A molecularly oriented polymeric film, comprising:
(a) a first layer of a blend material comprising: (i) about 1 percent to less than 5 percent by weight polyetheramide block copolymer and (ii) about 99 percent to more than 95 percent by weight ethylene vinyl alcohol copolymer, said first layer having two surfaces;
(b) second and third layers comprising nylon on the opposing surfaces of said first layer; and
(c) a fourth layer on the surface of said third layer and comprising a heat seatable polymer of copolymer, having heat sealing properties compatible with heat sealing;
the polyetheramide block copolymer having the formula:

wherein PA is a polyamide and PE is a polyether, n being an integer indicative of the degree of polymerication of the block copolymer, the degree of polymerication being such that its melting point is about 120° C. to about 205° C.

54. A molecularly oriented polymeric film as in claim 53 and including a fifth layer of ethylene vinyl acetate between said fourth sealant layer and said third layer.

55. A molecularly oriented polymeric film as in claim 53 and including fifth and sixth layers between said fourth sealant layer and said third layer, said fifth layer being ethylene vinyl acetate, said sixth layer being an adhesive polymer comprising a carboxy modified olefin polymer or copolymer; said fifth layer being adjacent said fourth layer, said sixth layer being adjacent said third layer, said fifth and sixth layers having a common interface.

56. A molecularly oriented film as in claim 53 wherein said film is uniaxially oriented at an orientation ratio of about 3/1 to 4/1.

57. A molecularly oriented film as in claim 54 wherein said film is uniaxially oriented at an orientation ratio of about 3/1 to 4/1.

58. A molecularly oriented film as in claim 55 wherein said film is uniaxially oriented at an orientation ration of about 3/1 to 4/1.

59. A molecularly oriented film as in claim 53 wherein said film is biaxially oriented at a ratio of 2×2 to 4×4.

60. A molecularly oriented film as in claim 54 wherein said film is biaxially oriented at a ratio of 2×2 to 4×4.

61. A molecularly oriented film as in claim 55 wherein said film is biaxially oriented at a ratio of 2×2 to 4×4.

62. A molecularly oriented film as in claim 53 wherein the composition of said fourth sealant layer is chosen from the group consisting of low density polyethylene, ethylene vinyl acetate, ionomer, and blends of the members of said group.

63. A molecularly oriented film as in claim 54 wherein the composition of said fourth sealant is chosen from the group consisting of low density polyethylene, ethylene vinyl acetate, ionomer, and blends of the members of said group.

64. A molecularly oriented film as in claim 55 wherein the composition of said fourth sealant layer is chosen from the group consisting of low density polyethylene, ethylene vinyl acetate, ionomer, and blends of the members of said group.

65. A method of making a film, comprising:
(a) forming a mixture of about 1 weight percent to less than 5 percent by weight of polyetheramide block copolymer and about 99 percent to more than 95 percent by weight ethylene vinyl alcohol copolymer;
(b) extruding said mixture through an extruder and die apparatus to form a film in which said mixture is present as a layer of blended materials of said mixture; and
(c) cooling said film,
the polyetheramide block copolymer having the formula:

wherein PA is a polyamide and PE is a polyether, n being an integer indicative of the degree of polymerication of the block copolymer, the degree of polymerization being such that its melting point is from about 120° C. to 205° C.

66. A method as in claim 65 including the subsequent steps of reheating the film and molecularly orienting it.

67. A method as in claim 65 and including coextruding, on one surface of said film, a layer of nylon to form a multiple layer film.

68. A method as in claim 67 and including the subsequent steps of reheating said multiple layer film and molecularly orienting it.

69. A method as in claim 65 and including coextruding, on both surfaces of said film, layers of nylon to form a multiple layer film.

70. A method as in claim 69 and including the subsequent steps of reheating the multiple layer film and molecularly orienting it.

71. A method as in claim 68 wherein said film is uniaxially oriented at a ratio of about 3/1 to 4/1.

72. A method as in claim 68 wherein said film is biaxially oriented at a ratio of 2×2 to 4×4.

73. A method as in claim 69 wherein said film is uniaxially oriented at a ratio of about 3/1 to 4/1.

74. A method as in claim 69 wherein said film is biaxially oriented at a ratio of about 2×2 to 4×4.

* * * * *